United States Patent
Tally et al.

(10) Patent No.: US 9,625,669 B2
(45) Date of Patent: Apr. 18, 2017

(54) CABLE TRAY JUNCTION AND SPLICE PLATE COUPLING SYSTEM

(71) Applicant: Cooper Technologies Company, Houston, TX (US)

(72) Inventors: Brandon Michael Tally, Greenville, IL (US); Stephen Nathaniel Thompson, Edwardsville, IL (US); Zheng Ren, St. Louis, MO (US)

(73) Assignee: Cooper Technologies Company, Houston, TX (US)

( * ) Notice: Subject to any disclaimer, the term of this patent is extended or adjusted under 35 U.S.C. 154(b) by 230 days.

(21) Appl. No.: 14/485,354

(22) Filed: Sep. 12, 2014

(65) Prior Publication Data

US 2016/0077299 A1    Mar. 17, 2016

(51) Int. Cl.
 G02B 6/00     (2006.01)
 G02B 6/44     (2006.01)
 H02G 3/06     (2006.01)

(52) U.S. Cl.
 CPC ......... *G02B 6/4459* (2013.01); *H02G 3/0608* (2013.01)

(58) Field of Classification Search
 CPC ..... G02B 6/4459; G02B 6/446; G02B 6/4461
 See application file for complete search history.

(56) References Cited

U.S. PATENT DOCUMENTS

| | | |
|---|---|---|
| 2,834,622 A | 5/1958 | Reeves |
| 2,860,742 A | 11/1958 | Waters, Sr. et al. |
| 2,905,416 A | 9/1959 | Wiegand |
| 3,022,972 A | 2/1962 | Bunston |
| 3,351,699 A | 11/1967 | Merckle |
| 3,618,882 A | 11/1971 | Podedworny |
| 5,067,678 A | 11/1991 | Henneberger et al. |
| 5,169,099 A | 12/1992 | Yang |
| 5,316,244 A | 5/1994 | Zetena, Jr. |
| 5,546,726 A * | 8/1996 | Stalzer .................. E04D 13/158 52/105 |
| 5,564,658 A | 10/1996 | Rinderer |
| 5,580,014 A | 12/1996 | Rinderer |
| 5,628,481 A | 5/1997 | Rinderer |
| 5,731,546 A | 3/1998 | Miles et al. |
| 5,782,439 A | 7/1998 | Rinderer |
| 5,816,542 A | 10/1998 | Rinderer |

(Continued)

OTHER PUBLICATIONS

PUK Kabelverlegungs-Systeme Kabelbahnen Cable trays Chemins de Cables, Katalog '93, admitted prior art.

(Continued)

*Primary Examiner* — Chad Smith
(74) *Attorney, Agent, or Firm* — Senniger Powers LLP

(57) ABSTRACT

A cable tray junction includes floor panel and a post secured to the floor panel. The post includes a splice plate connector defining a female coupling component. A splice plate interconnects the post and a cable tray. The splice plate includes a post connector, which defines a male coupling component received in the female coupling component to connect the splice plate to the post without the use of a separate fastener. The splice plate connector may have a curved groove and the post connector may have a tongue received in the curved groove. A wall panel connector of the post defines a wall panel groove in which a wall panel is received to connect the wall panel to the post.

15 Claims, 11 Drawing Sheets

(56) References Cited

U.S. PATENT DOCUMENTS

| | | | |
|---|---|---|---|
| 5,917,982 A | 6/1999 | Vargas et al. | |
| 5,992,802 A | 11/1999 | Campbell | |
| 6,068,220 A | 5/2000 | Alrey | |
| 6,547,192 B2 * | 4/2003 | Rinderer | H02G 3/0608 248/49 |
| 7,742,675 B2 * | 6/2010 | Sayres | G02B 6/4459 248/68.1 |
| 8,333,291 B2 * | 12/2012 | Rosendahl | H01R 13/506 220/4.02 |
| 2009/0032651 A1 * | 2/2009 | Sayres | H02G 3/0418 248/68.1 |

OTHER PUBLICATIONS

FAST-track, Davis Total Cable Management, pp. 9 and 11, admitted prior art.
Swifts Product Quide, pp. 9 and 15, at least as early as Sep. 1, 2013.

* cited by examiner

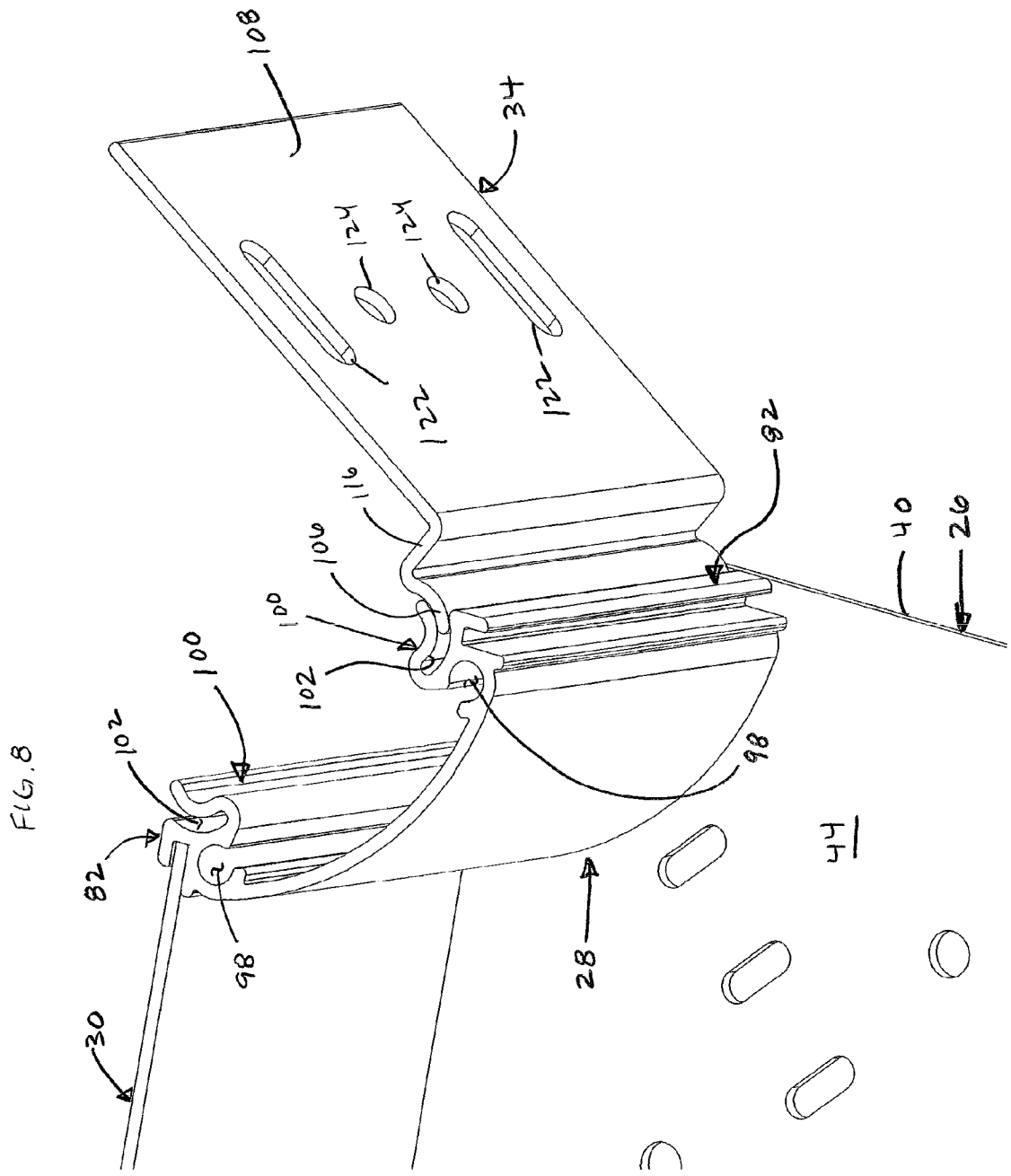

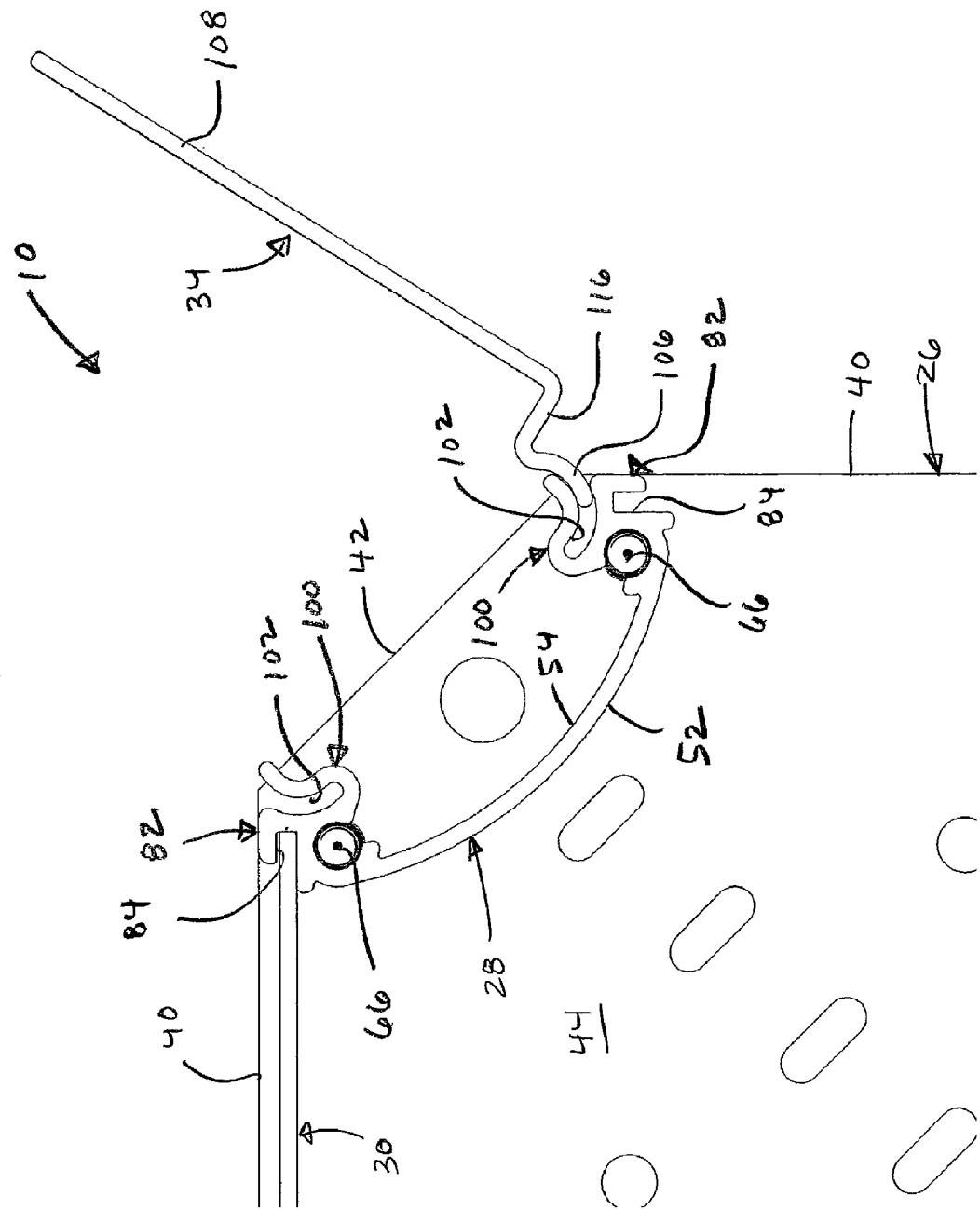

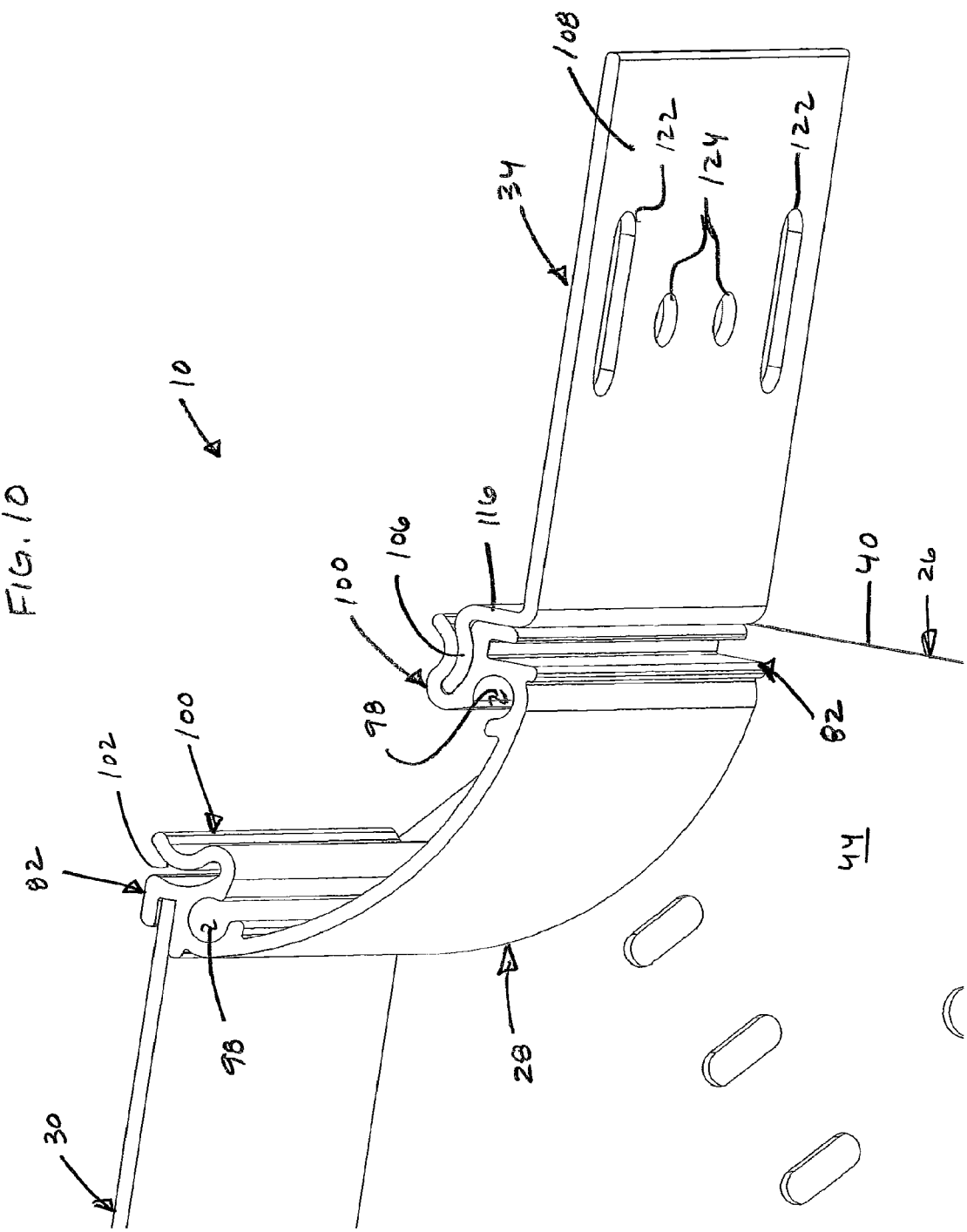

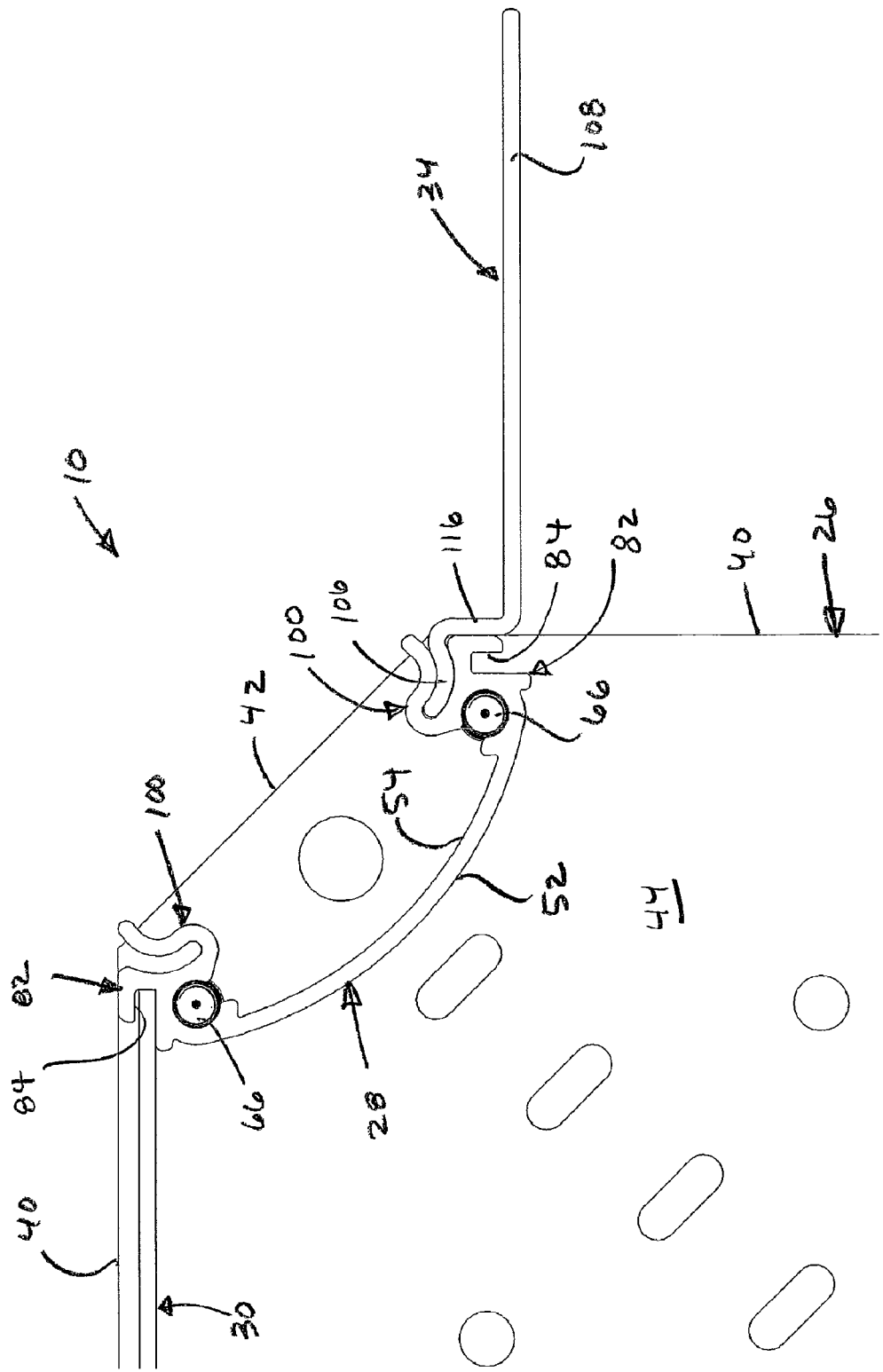

CABLE TRAY JUNCTION AND SPLICE PLATE COUPLING SYSTEM

FIELD OF THE DISCLOSURE

The present disclosure generally relates to a cable tray junction and a splice plate coupling system.

BACKGROUND OF THE DISCLOSURE

Junctions may be used for the joinder of cable trays in cable tray systems wherein cable (or bundles thereof), including electrical cable or conduit, data transmission cable and the like, is strung.

SUMMARY OF THE DISCLOSURE

In one aspect, a cable tray junction system generally comprises a floor panel having an upper face. A post is adapted for securement to the floor panel such that the post extends upward from the upper face. The post includes a post body having opposite sides, and a splice plate connector defining a female coupling component adjacent at least one of the respective sides of the post body. A splice plate is adapted to interconnect the post and a cable tray. The splice plate includes a tray connector and a post connector. The tray connector includes at least one fastener opening for receiving a fastener to fasten the tray connector to a cable tray. The post connector defines a male coupling component adapted to be received in the female coupling component to connect the splice plate to the post without the use of a separate fastener.

In another aspect, a splice plate coupling system generally comprises a first structural component including a splice plate connector defining a curved groove. A splice plate is adapted for splicing the first structural component to a second structural component. The splice plate comprises a first structural component connector comprising a tongue adapted for insertion in the curved groove to connect the splice plate to the first structural component without the use of a separate fastener.

In yet another aspect, a cable tray junction system generally comprises a floor panel having an upper face. A wall panel has opposite longitudinal ends and opposite upper and lower edges. A post is adapted for securement to the floor panel such that the post extends upward from the upper face. The post includes a post body having opposite sides, and a wall panel connector adjacent at least one of the respective sides of the post body defining a wall panel groove adapted to receive one of the opposite longitudinal ends of the wall panel for connecting the wall panel to the post.

Other features will be in part apparent and in part pointed out hereinafter.

BRIEF DESCRIPTION OF THE DRAWINGS

FIG. 8 is an enlarged partial perspective showing the splice plate being connected to the post;

FIG. 9 is a top plan view of FIG. 8;

FIG. 10 is an enlarged partial perspective showing the splice plate connected to the post; and FIG. 11 is a top plan view of FIG. 10.

Corresponding reference characters indicate corresponding parts throughout the drawings.

DETAILED DESCRIPTION OF THE DISCLOSURE

Figure 1:
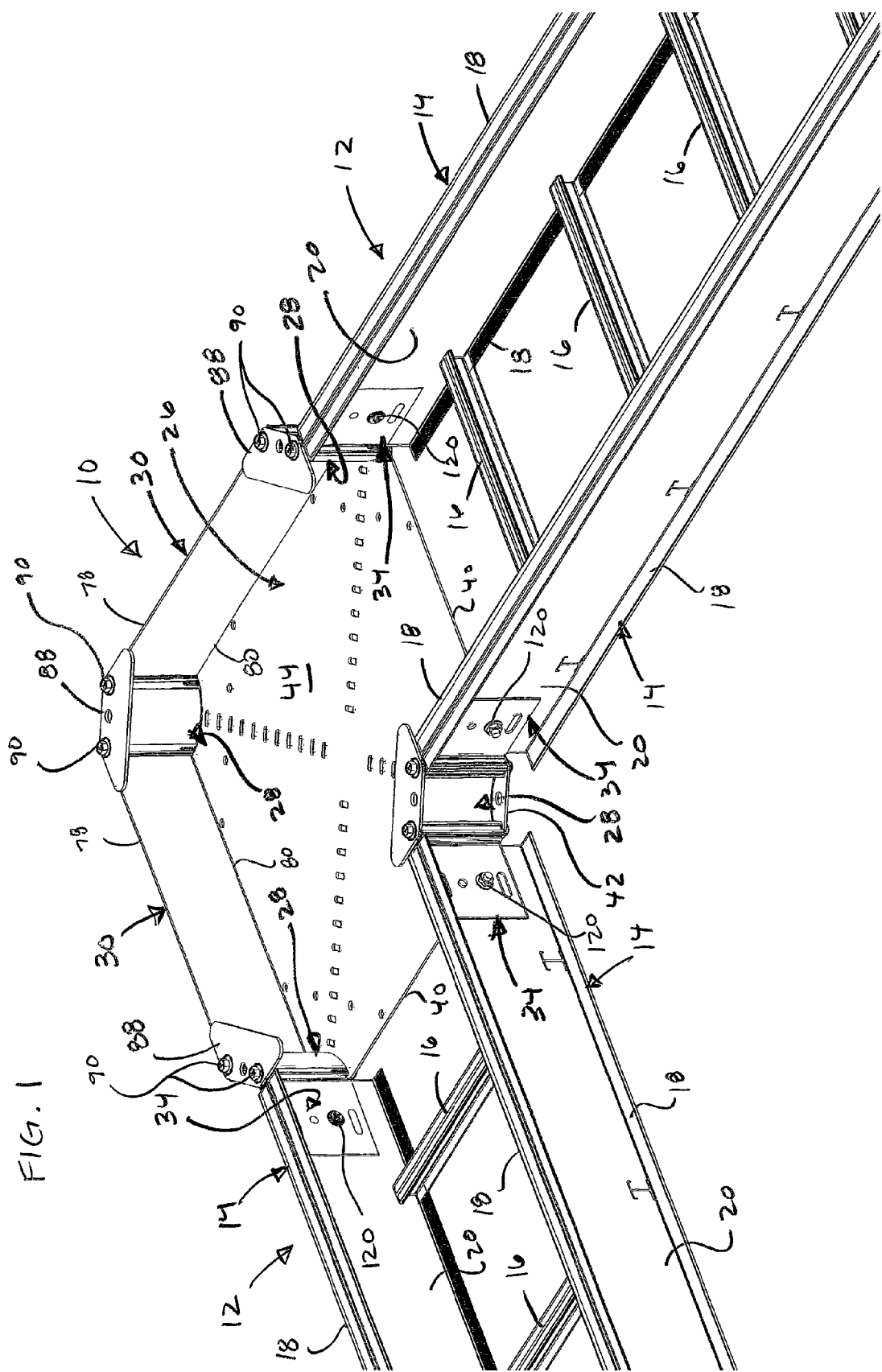
FIG. 1 is a top perspective of a cable tray junction interconnecting two cable trays.

Referring to the drawings, a cable tray junction of an embodiment of the present disclosure is generally designated in its entirety by the reference numeral 10. As shown in FIG. 1, the cable tray junction 10 is adapted to be positioned at the junction of and interconnect two or more cable trays, each generally indicated at 12 (e.g., two, three, four, or more cable trays), as shown in FIG. 1. The illustrated cable trays 12 are typically referred to as ladder-type cable trays and include opposing side rails, each generally indicated at 14, and a plurality of spaced apart rungs 16 extending between and interconnecting the side rails. Each side rail 14 includes upper and lower flanges 18 and a vertical web 20 extending between and interconnecting the flanges. It is understood that the cable trays 12 may be of other types and/or configurations without departing from the scope of the present invention.

Figure 2:
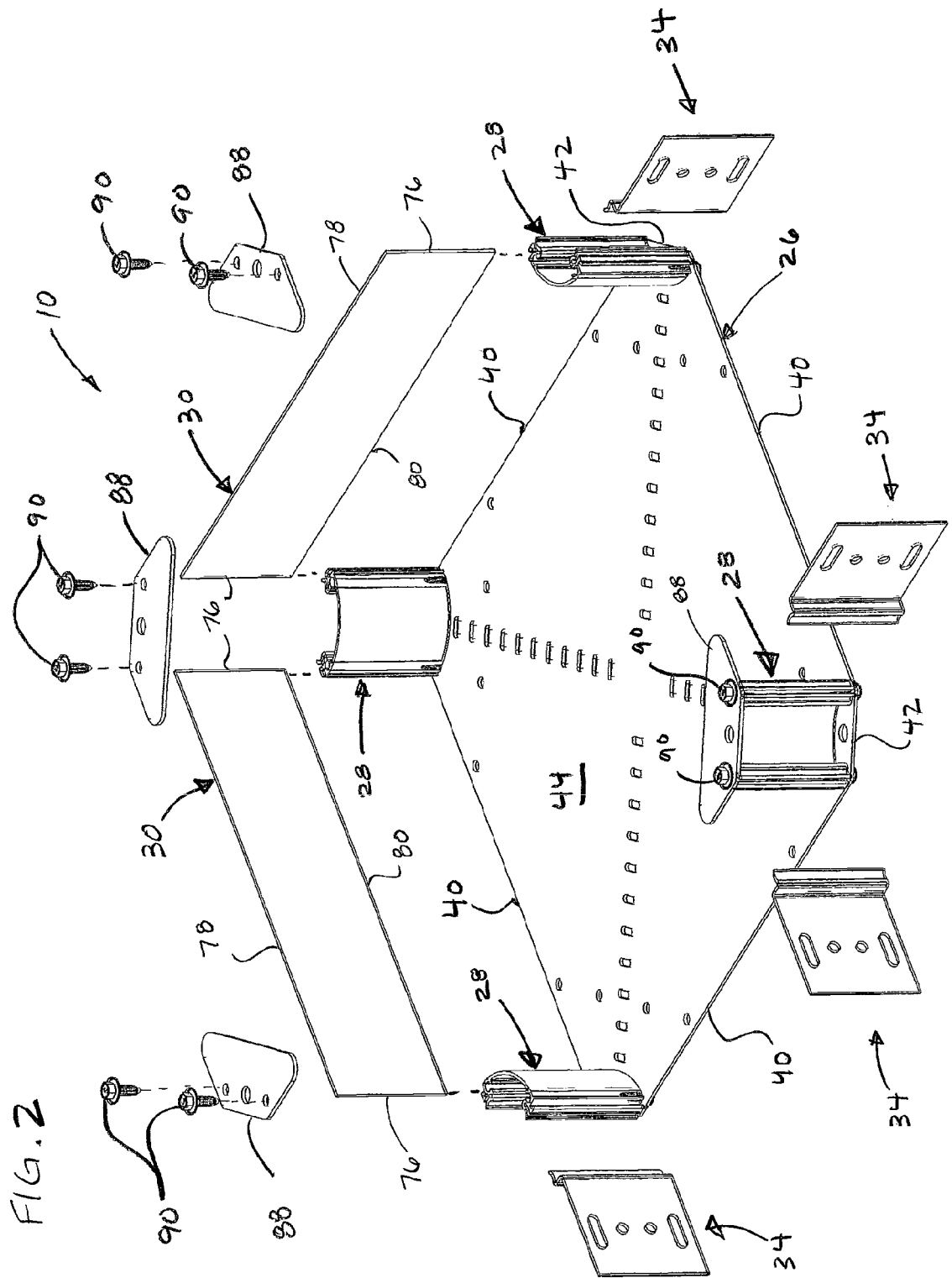
FIG. 2 is an exploded top perspective of the cable tray junction.
Figure 3:
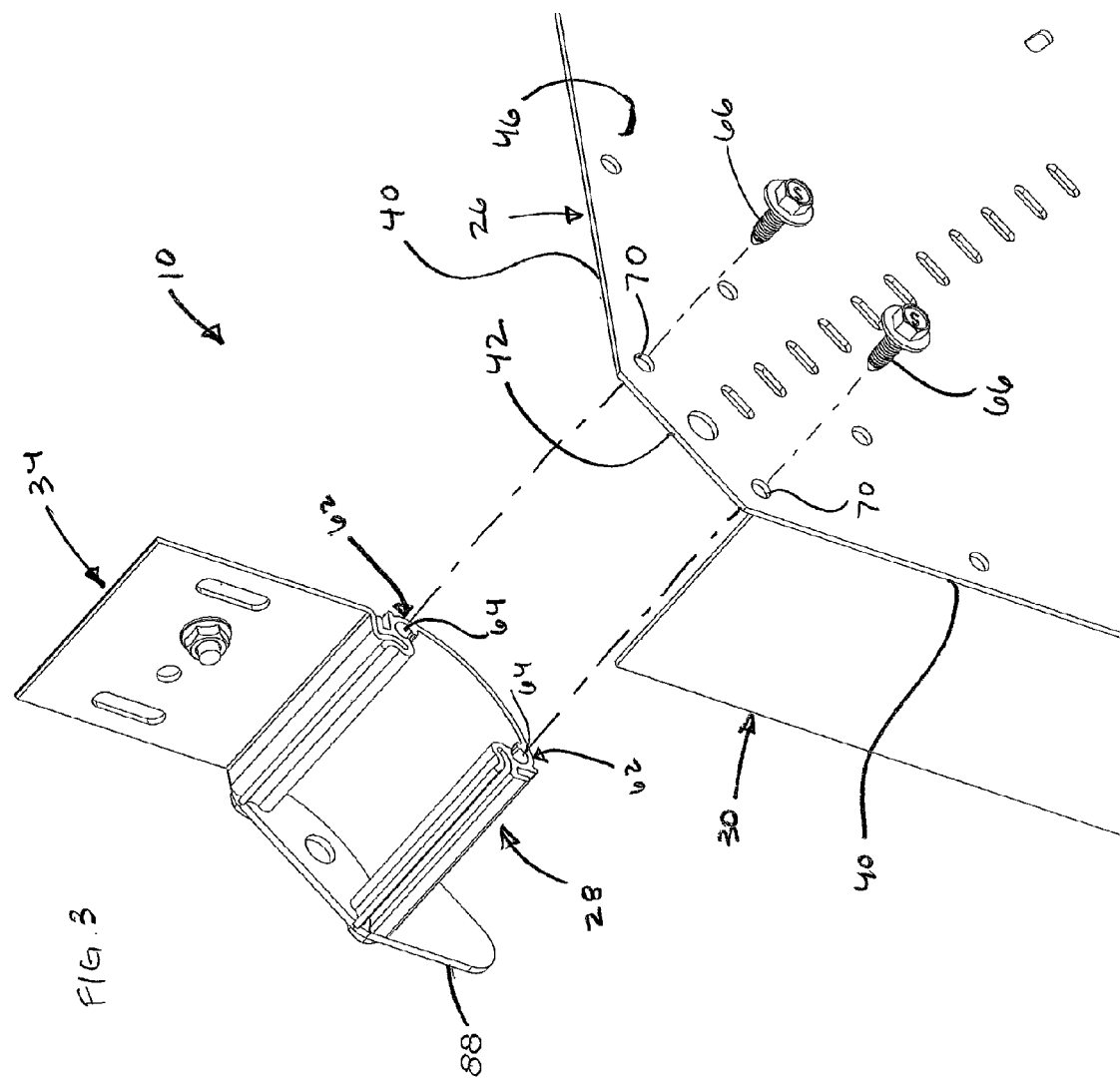
FIG. 3 is a partial bottom perspective of the cable tray junction, showing a post thereof exploded from a floor panel thereof.

As shown in FIGS. 1-3, the cable tray junction 10 is configured as a system generally comprising a floor panel (e.g., a floor plate), generally indicated by reference numeral 26; a plurality of posts (e.g., four posts), each generally indicated by reference numeral 28, adapted to be secured to the floor panel; one or more wall panels (e.g., wall plate(s)), each generally indicated at 30, adapted to be secured to and extend between adjacent posts; and one or more splice plates, generally indicated at 34, each of which is adapted to interconnect one of the posts and one of the cable trays 12. In the illustrated embodiment, the cable tray junction 10 is easily configurable for joining two, three, or four cable trays 12 to one another, although the cable tray junction may be configurable for joining any number of cable trays (i.e., two or more) to one another. For example, in FIG. 1 the cable tray junction 10 is configurable to join two cable trays 12 in an L-formation. In addition, as will be understood, the cable tray junction 10 may be configurable to join three cable trays in a T-formation, or may be configurable to join four cable trays in a cruciform formation. Moreover, adjacent posts 28 may be positioned on the floor panel 26 to connect cable trays 12 having different widths. The cable tray junction 10 may be configurable to join two or more cable tray 12 in other formations without departing from the scope of the present invention. Accordingly, the cable tray junction 10 is generally modular, with the components thereof (e.g., the posts 28, the wall panels 30, and the splice plates 34) constituting modules of the system.

Figure 6:
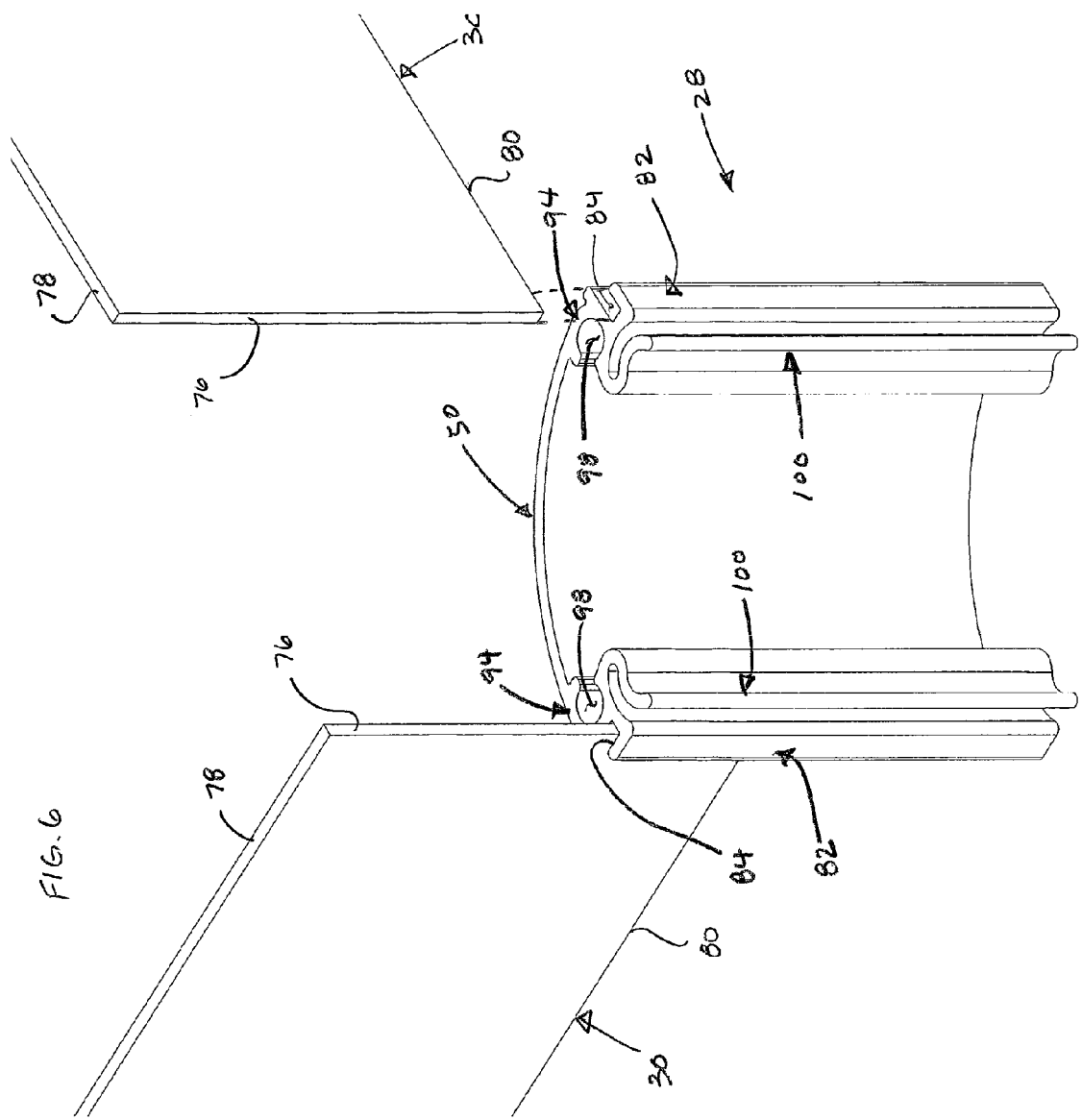
FIG. 6 is an enlarged perspective the post and wall panels being connected to the post.

Referring to FIGS. 1 and 2, the illustrated floor panel 26 is of generally rectilinear outline thereby having four sides, each indicated at 40, extending at right angles to one another meeting at four corners, each indicated at 42 (only one corner is visible in FIG. 1; two corners in FIG. 2). So installed, the floor panel 26 is orientated generally horizontally with one face 44 of the panel facing upward, constituting its upper face, and its other face constituting its lower face being designated 46 (FIG. 6). The dimensions of the floor panel 26 are not critical. By way of example, the floor panel 26 may be a generally square plate having a side dimension of 6 in., 9 in., 12 in., 18 in., 24 in., or 36 in. The thickness of the panel 26 may vary from 1/16 in. to 3/16 in. These dimensions should not be considered to be all-inclusive or limiting in any way. The panel 26 may be formed from a suitable material, such as metal (e.g., 6063T6 aluminum).

Figure 4:
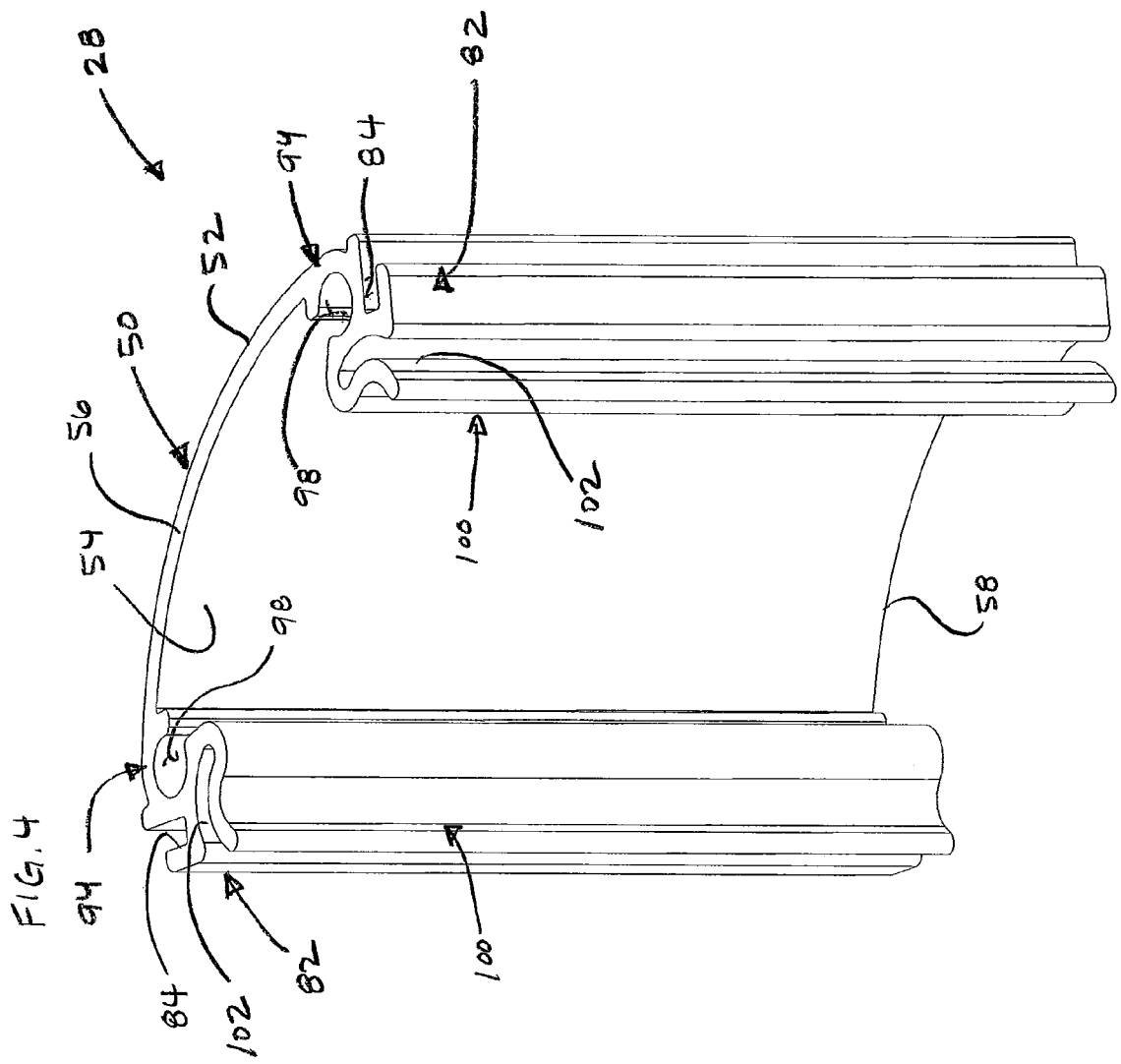
FIG. 4 is an enlarged perspective of a post of the cable tray junction.
Figure 5:
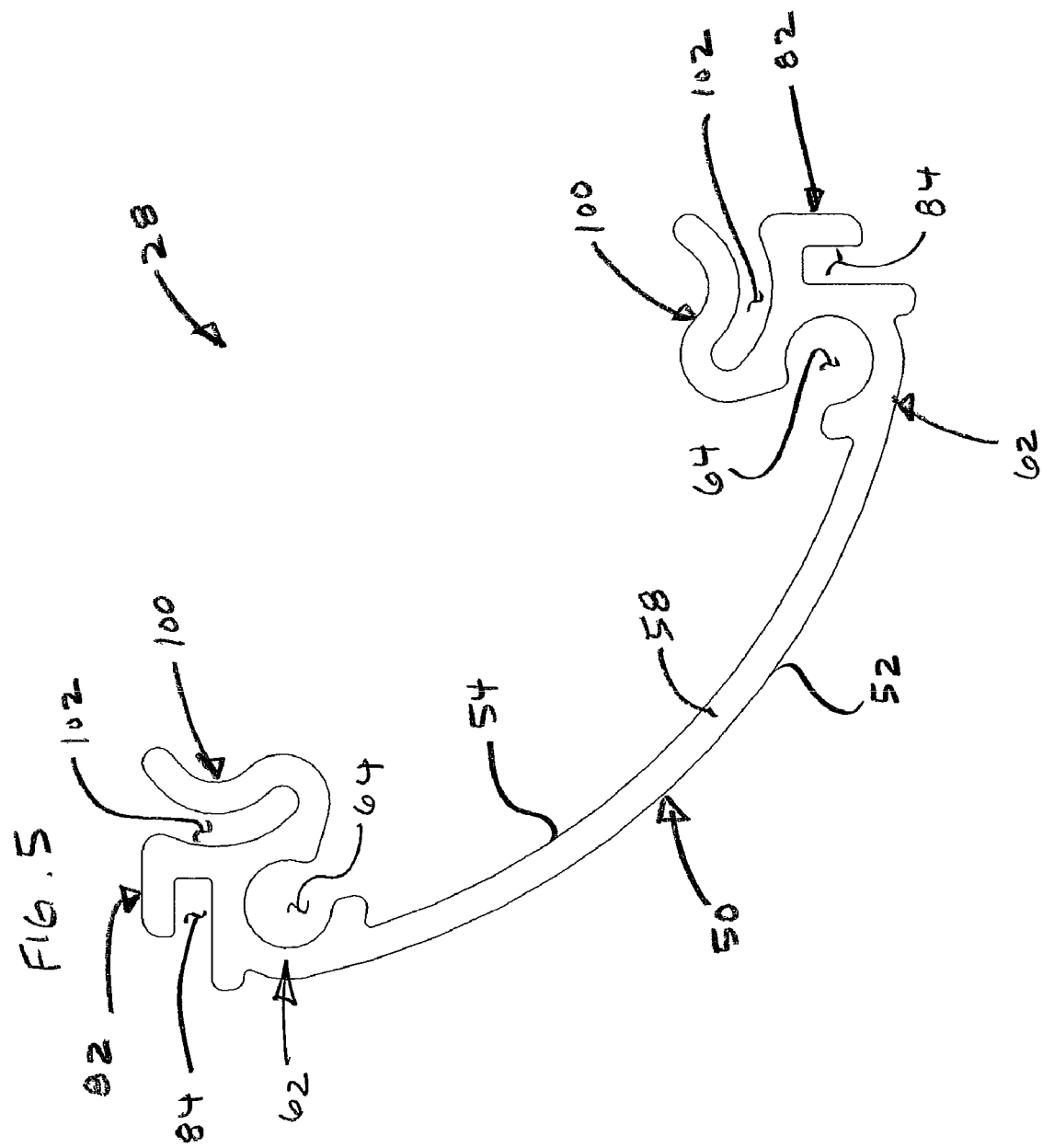
FIG. 5 is a bottom plan of the post.

The posts 28 extend upward from the upper face 44 adjacent the respective corners 42 of the floor panel 26. In the illustrated embodiment, the posts 28 are generally identical in size, shape and function to enhance modularity of the cable tray junction 10. An exemplary representative post 28 is shown in FIGS. 4 and 5 and described below, with the understanding that teachings of this post set forth herein apply equally to all of the posts. The post 28 comprises a post body, in the form of a curved strip generally indicated at 50 in the illustrated embodiment. The post body 50 extends about a 90° arc of a circle and has an curved (arcuate) inward surface 52 (e.g., a convex surface) facing inside the tray junction 10, a curved (arcuate) outward surface 54 (e.g., a concave surface) facing outside the tray junction, a top edge 56, and a bottom edge 58. The inward surface 52 is configured for guiding cable as it is pulled around from one cable tray 12 to another. The curvature of the inward surface 52 is such as to enable the bending of the cable as it is pulled around inward surface while preserving the integrity of the cable. In particular, as to installation of data transmission cable and the pulling thereof around from one cable tray 12 to another, the curvature is such as to enable the bending of the data transmission cable around a corner from one tray to another without adversely affecting its data transmission quality.

Referring to FIGS. 3 and 5, the post 28 further comprises floor panel connectors, generally indicated at 62 defining fastener openings 64 adjacent the respective sides of the post body 50 for receiving floor panel fasteners 66 (e.g., self-tapping screws) to secure the post to the floor panel adjacent one of the respective corners 42 of the floor panel. The self-tapping screws 66 extend up through openings 70 (see FIG. 3) in the floor panel and threaded into the fastener openings 64 of the respective floor panel connectors 62. Each fastener opening 64 extends heightwise through lower ends of the floor connectors 62. It is understood that the fastener openings 64 may be provided on the post body 50. Other ways of securing the posts 28 to the floor panel 26 do not depart from the scope of the present invention.

Referring to FIGS. 2 and 6, the wall panels 30 may be substantially identical in size and shape to enhance modularity of the cable tray junction 10. The illustrated wall panels 30 are of a generally rectangle outline, and may have thicknesses varying from 1/16 in. to 3/16 in. Each wall panel 30 has opposite longitudinal ends 76, a length extending between the longitudinal ends, and upper and lower edges 78, 80, respectively, extending lengthwise. The wall panels 30 are connected to respective posts 28 via wall panel connectors 82 of the posts. Each post 28 has two wall panel connectors 82 defining wall panel grooves 84 adjacent the respective sides of the post body 50 for receiving one of the longitudinal ends 76 of the wall panel 30. The wall panel grooves 84 extend heightwise of the post body 50 and through top and bottom edges of the wall panel connectors 82.

As installed (FIGS. 1 and 2), the longitudinal ends 76 of each wall panel 30 are insertable (e.g., slidably inserted downward as shown in FIG. 6) into respective wall panel grooves 84 of adjacent posts 28 such that the wall panel extends between the adjacent posts. When inserted in the corresponding wall panel grooves 84 (FIGS. 1 and 2), each wall panel 30 extends generally along (i.e., parallel and adjacent to) a corresponding side 40 of the floor panel 26, the lower edge 80 rests on the upper surface 44 of the floor panel, and the upper edge 78 is at an elevated position to thereby form a side wall of the cable tray junction 10. A post cap 88 (e.g., a plate) is secured to the upper edge 56 of each post 28 by fasteners 90 (e.g., self-tapping screws) inserted through openings in the post cap and threaded into post cap connectors (FIGS. 4 and 6), generally indicated at 94, which define fastener openings 98 that extend through upper ends of the post cap connector and are coextensive with the fastener openings 64 defined by the floor panel connectors 62 in the illustrated embodiment. As secured to the posts 28, the post caps 88 extend over the wall panel grooves 84 and the upper edges 78 of the respective wall panels 30 to capture the wall panels between the post caps and the floor panel 26 to inhibit the side panels from sliding upward and downward out of the wall panel grooves.

In the illustrated embodiment, the wall panel grooves 84 of each post 28 are configured such that two wall panels inserted in the same post extend at a generally 90 degree angle relative to one another. The cable tray junction 10 illustrated in FIGS. 1 and 2 includes two wall panels 30, a center post 28 to which both of the wall panels are connected, a left post to which one of the wall panels is connected, and a right post to which the other of the wall panels is connected. Other configurations are possible, as can be understood. Thus, it can be seen that the wall panels can be easily arranged on the floor panel to configure the cable tray junction in different formations depending on a desired function. Moreover, it is contemplated that in at least one formation (e.g., a cruciform formation), the wall panels 30 may be omitted from the cable tray junction 10.

Figure 7:
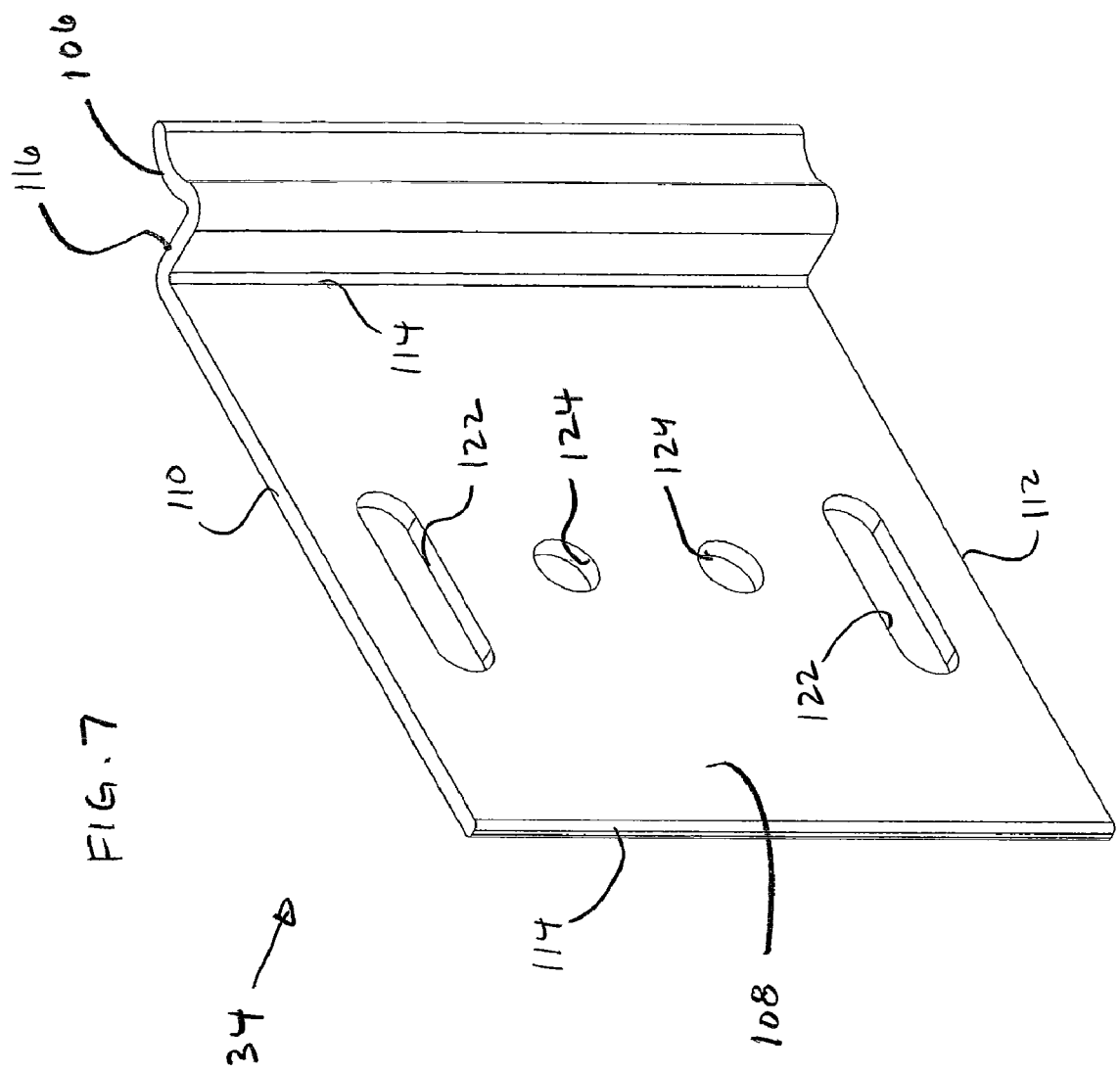
FIG. 7 is an enlarged perspective of a splice plate of the cable tray junction.

Referring to FIGS. 4 and 5, each post 28 further comprises two splice plate connectors 100, each adapted to connect to one of the splice plates 34. Each splice plate connector 100 comprises a female coupling component, adjacent respective the sides of the post body, defining a curved groove 102. Referring to FIG. 7, each splice plate 34 includes a post connector 106 (broadly, a structural component connector) comprising a male coupling component adapted to mate with the curved groove 102 of the splice plate connector 100 to connect the splice plate to the post 34 without the use of separate fasteners, and a tray connector 108 adapted for securement to one of the cable trays 12. The illustrated tray connector 108 comprises a splice panel (broadly, a structural component connector) having upper and lower edges 110, 112, respectively, and opposite ends 114 extending between the upper and lower edges. A flange 116 extends laterally from one end of the splice panel and interconnects the tray connector 108 and the male coupling component 106 such that the male coupling component is laterally offset from the tray connector. The splice panel 108 is generally planar (e.g., flat) and has a plurality of fastener openings extending through opposite faces thereof for receiving one or more fasteners (e.g., bolts 120; FIG. 1) to fasten the splice plate 34 to one of the vertical webs 20 of one of the cable trays 12. In the illustrated embodiment (FIG. 7), each splice panel 108 has an upper and lower slots 122 extending lengthwise, and upper and lower round openings 124 between the slots. The fastener openings may be of other configurations.

In the illustrated embodiment, the curved groove 102 of the splice plate connector 100 extends heightwise of the post body 50, and the male coupling component 106 of the splice plate 34 comprises a curved tongue adapted for sliding, lateral insertion in the curved groove. Referring to FIGS. 8-11, the tongue 106 is configured to track along the curved groove 102 during lateral insertion such that the splice plate 34 rotates from a first orientation (FIGS. 8 and 9) to a second orientation (FIGS. 10 and 11) to lock the tongue in the curved groove and connect the splice plate to the post 28. Moreover, the connection between the splice plate groove 102 and the tongue 106 is such that the splice plate must be rotated from the second orientation toward the first orientation to disconnect the splice plate from the post 28. It is understood that the splice plate 34 and the post 28 may be interconnected in other ways using a different splice plate connector and/or a different post connector that do not require the use of separate fasteners, without departing from the scope of the present invention. It is also understood that the splice plate connector 100 may be associated with another type of structural component other than the posts 28 for connecting the splice plate 34 to the structural component to splice two structural components to one another.

One embodiment of a method of assembling a cable tray assembly will now be described. The cable tray junction 10 may be preassembled or partially pre-assembled before delivery to a job site, or the cable tray junction may be assembled in part or in whole at the job site. The floor panel 26, posts 28, post caps 88, and splice plates 34 are provided. One or more wall panels 30 are optionally provided, depending on the application (e.g., a cruciform formation does not require wall panels). The posts 28 are fastened to the floor panel 26 using the fasteners 66, as described above, so that the posts are adjacent the corners 42 of the floor panel and extend upward therefrom. In the illustrated embodiment, two wall panels 30 are slidably inserted into respective wall panel grooves 84 of three of the posts 28 so that the two wall panels extend along adjacent sides 40 of the floor panel 26 and form adjacent walls. The splice plates 34 (e.g., four splice plates) are inserted into respective splice plate grooves 102 of the posts 28 (e.g., three posts), as described above, to lock the splice plates in the splice plate grooves. After connecting the splice plates 34 to the posts 28, the cable trays 12 (e.g., two cable trays 12) are fastened to the splice plates, as described above. The post caps 88 are fastened to the top of the post to inhibit the wall panels 30 and the splice plates 34 from sliding upward out of the grooves 84, 102 of the respective wall panel connectors 82 and splice plate connectors 100. As can be understood, different variations of the formation of the cable tray junction 10 are possible.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A cable tray junction system comprising:
    a floor panel having an upper face;
    a post adapted for securement to the floor panel such that a height of the post extends upward from the upper face, the post including a post body having opposite sides, and a splice plate connector defining a female coupling component adjacent at least one of the respective sides of the post body, wherein the female coupling component defines a curved groove extending along the height of the post and being curved in a direction transverse to the height of the post; and
    a splice plate adapted to interconnect the post and a cable tray, the splice plate including a tray connector and a post connector, the tray connector including at least one fastener opening for receiving a fastener to fasten the tray connector to a cable tray, the post connector defining a male coupling component adapted to be received in the female coupling component to connect the splice plate to the post without the use of a separate fastener, wherein the male coupling component includes a tongue configured for insertion in the curved groove.

2. The cable tray junction system set forth in claim 1, wherein the tongue is configured to track along the curved groove such that the splice plate rotates from a first orientation to a second orientation to lock the tongue in the curved groove and connect the splice plate to the post.

3. The cable tray junction system set forth in claim 2, wherein the tray connector includes a splice panel having upper and lower edges and opposite ends extending between the upper and lower edges, wherein the post connector further includes a flange interconnecting one of the ends of the splice panel and the tongue such that the tongue is laterally offset from the tray connector.

4. The cable tray junction system set forth in claim 2, wherein the splice plate is configured such that it must be rotated from the second orientation toward the first orientation when the tongue is locked in the curved groove to disconnect the splice plate from the post.

5. The cable tray junction system set forth in claim 1, wherein the tongue extends along a height of the splice plate and is curved in a direction transverse to the height of the splice plate.

6. The cable tray junction system set forth in claim 1, wherein the splice plate connector comprises two splice plate connectors adjacent the respective sides of the post.

7. The cable tray junction system set forth in claim 1, further comprising a wall panel having opposite longitudinal ends and opposite upper and lower edges, wherein the post further includes a wall panel connector adjacent at least one of the respective sides of the post body defining a wall panel groove for receiving one of the longitudinal ends of the wall panel to connect the wall panel to the post.

8. The cable tray junction system set forth in claim 1, wherein the post further includes a floor panel connector adjacent at least one of the respective sides of the post body defining a fastener opening for receiving floor panel fasteners to secure the post to the floor panel.

9. The cable tray junction system set forth in claim 1, further comprising:
    a wall panel having opposite longitudinal ends and opposite upper and lower edges,
    wherein the post further includes a wall panel connector adjacent at least one of the respective sides of the post body defining a wall panel groove for receiving one of the longitudinal ends of the wall panel for connecting the wall panel to the post,
    wherein the post further includes a floor panel connector adjacent at least one of the respective sides of the post body defining fastener openings for receiving floor panel fasteners to secure the post to the floor panel.

10. A cable tray junction system comprising: a floor panel having an upper face; a wall panel having opposite longitudinal ends and opposite upper and lower edges; and a post adapted for securement to the floor panel such that a height of the post extends upward from the upper face, the post including a post body having opposite sides, and a wall panel connector adjacent at least one of the respective sides of the post body defining a wall panel groove extending along the height of the post and adapted to receive one of the opposite longitudinal ends of the wall panel for connecting the wall panel to the post, wherein the wall panel groove has an open upper end through which said one of the opposite longitudinal ends of the wall panel is inserted into the wall panel groove; and a splice plate connector adjacent at least one of the respective sides of the post body defining a female coupling component; and a splice plate adapted to interconnect the post and a cable tray, the splice plate including a tray connector and a post connector, the tray connector including at least one fastener opening for receiving a fastener to fasten the tray connector to a cable tray, the post connector defining a male coupling component configured to be received in the female coupling component to connect the splice plate to the post without the use of separate fasteners.

11. A cable tray junction system set forth in claim 10, wherein the wall panel connector includes two wall panel connectors adjacent respective sides of the post body.

12. A cable tray junction system set forth in claim 10, further comprising a post cap adapted to be secured to an upper end of the post and over the open upper end to capture the longitudinal end of the wall panel in the wall panel groove between the floor panel and the post cap.

13. A cable tray junction system set forth in claim 10, wherein the open upper end of the wall panel groove extends through an upper end of the post.

14. A post adapted for securement to a floor panel of a cable tray junction system, the post comprising:

a post body having opposite first and second sides and a height extending between upper and lower ends of the post body;

a first curved groove at the first side of the post body and extending along the height of the post body, wherein the first curved groove is curved in a direction transverse to the height of the post body, the first curved groove configured to receive a curved tongue of a first splice plate to secure the first splice plate to the post;

a second curved groove at the second side of the post body and extending along the height of the post body, wherein the second curved groove is curved in a direction transverse to the height of the post body, the second curved groove configured to receive a curved tongue of a second splice plate to secure the second splice plate to the post;

a first wall panel groove at the first side of the post body adjacent the first curved groove and extending along the height of the post body, the first wall panel groove configured to receive one of opposite longitudinal ends of a first wall panel for connecting the first wall panel to the post, wherein the first wall panel groove has an open upper end through which said one of the opposite longitudinal ends of the first wall panel is inserted into the first wall panel groove; and a second wall panel groove at the second side of the post body adjacent the second curved groove and extending along the height of the post body, the second wall panel groove configured to receive one of opposite longitudinal ends of a second wall panel for connecting the second wall panel to the post, wherein the second wall panel groove has an open upper end through which said one of the opposite longitudinal ends of the second wall panel is inserted into the second wall panel groove.

15. A post set forth in claim 14, further comprising a post cap adapted to be secured to the upper end of the post over the open upper ends of the respective first and second wall panel grooves to capture the wall panels in the first and second wall panel grooves between the floor panel and the post cap.

* * * * *